United States Patent [19]

Simjian

[11] 4,436,992
[45] Mar. 13, 1984

[54] CHECK CONTROLLED METERING DEVICE

[76] Inventor: Luther G. Simjian, 1750 S. Ocean La., Ft. Lauderdale, Fla. 33316

[21] Appl. No.: 414,414

[22] Filed: Sep. 2, 1982

Related U.S. Application Data

[63] Continuation-in-part of Ser. No. 223,239, Jan. 8, 1981.

[51] Int. Cl.³ .............................................. G06F 7/08
[52] U.S. Cl. ..................................... 235/381; 235/380
[58] Field of Search ........................ 235/380, 381, 379

[56] References Cited

U.S. PATENT DOCUMENTS 4,219,151  8/1980  Haruki .................................. 235/379

Primary Examiner—Harold I. Pitts

[57] ABSTRACT

In a check controlled postage meter a computer terminal is provided for receiving a partially coded check. The check is decoded and additional information, such as register settings and subscriber identification data, is supplied by a subscriber via manual input means at the computer terminal. Responsive to all of the data being suitably correlated as determined by the computing means, the computing means transmits validation data to the terminal for encoding the check, causing the check to be usable for operating the postage meter by permitting the recharging of its credit register.

6 Claims, 3 Drawing Figures

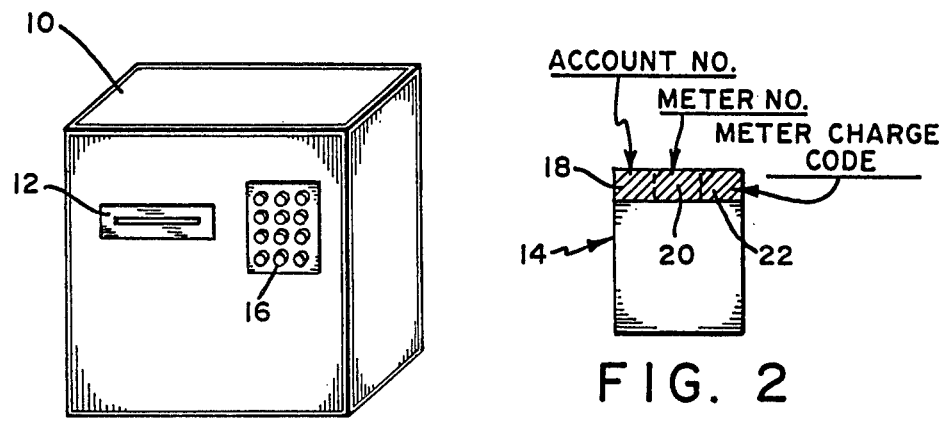
FIG. 1
FIG. 2
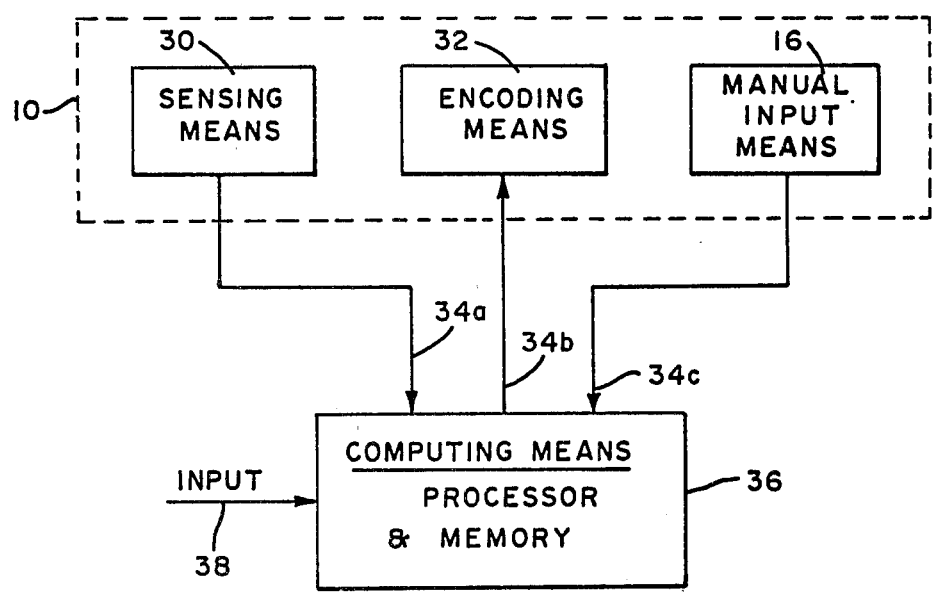
FIG. 3

CHECK CONTROLLED METERING DEVICE

This application is a continuation-in-part application of my copending application for U.S. Letters Patent Ser. No. 6/223,239 filed Jan. 8, 1981.

BACKGROUND OF THE INVENTION

This invention is related to check controlled metering devices such as has been disclosed in U.S. Pat. Nos. 4,218,011; 4,222,518 and 4,226,360. In these prior patents I have disclosed various arrangements for operating a metering device, particulary a postage meter, by means of a valid or validated check or coupon. The valid check is brought into operative engagement with the postage meter and permits charging the postage meter so that the meter is usable for a new incremental sum of money, typically a sum of $100, $200 or $500, depending upon the setting of the meter mechanism or other factors.

In U.S. Pat. Nos. 4,222,518 and 4,226,360 I have disclosed arrangements wherein the owner of the postage meter, also termed subscriber, is required to obtain predetermined code data from a remote computer and input the code data obtained at the meter in order to render the meter operable. The data obtained must be in predetermined relationship with the coded data on the check. In U.S. Pat. No. 4,249,071 I have disclosed an arrangement wherein the code data obtained are entered directly on the check itself by the subscriber. The check, in this manner, is validated and usable for operating the postage meter.

The present operation provides an arrangment in which the check becomes validated for use by means of a computer controlled terminal. The computer either forms a part of the terminal or is located at a remote location for controlling the operation at a plurality of terminals.

As disclosed hereafter, there is provided an apparatus which may comprise the terminal of a computing means. The subscriber previously has obtained, by purchase or otherwise, a check for operating a postage meter which is under his control. At this moment the check is not usable, i.e. invalid, for rendering the meter operable because either the check is new or the previously authorized increment provided by the check to the meter has been used. In order to validate the check, the subscriber inserts the check into the apparatus. The apparatus by suitable sensing means, such as magnetic decoding means, senses, for instance, the subscriber identification data and the meter data on the check and transmits the data to the computing means. In addition, the subscriber is required to input by key means additional information only known to him which may comprise additional subscriber identification data, the respective readings of the descending counter and of the ascending counter of the meter register. These data are processed by the computing means and if the data are in predetermined correlation, for instance, the sum of the two counter readings equals a stored sum in the computing means and absent any credit hold input stored in the computing means, data are sent to the apparatus to suitably encode the check to thereby validate it for rendering the postage meter operable when the validated check is brought into operative engagement with the meter as disclosed in my earlier patents supra.

Other features of this invention will be more clearly apparent by reference to the following description which should be read in conjunction with the accompanying drawings.

DESCRIPTION OF THE DRAWING

FIG. 1 is a perspective view of the apparatus for receiving a check;

FIG. 2 is a plan view of a typical embodiment of a check, and

FIG. 3 is a schematic block diagram of the invention.

DETAILED DESCRIPTION OF THE INVENTION

Referring to the figures and FIG. 1 in particular, there is shown an apparatus 10 which may comprise, for instance, a computer terminal operating with a near or remote computing means. The apparatus includes a check receiving means 12 for accepting a check 14, see FIG. 2, which may comprise a plastic card. The apparatus includes, moreover, a keyboard 16 for keying as input information data known to the subscriber, typically the settings of the ascending and of the descending counters of the meter and possibly also additional subscriber identification data.

FIG. 2 is an example of a typical check having three encoded fields. Field 18 may contain encoded data with respect to the subscriber, that is the account number, field 20 may contain the meter number with which the check is cooperatively associated, and field 22 is provided for the meter "charge" code, that is the code enabling the meter mechanism to be recharged for providing for the dispensing of an increment of postage.

In a typical case, the apparatus or terminal 10 may be located in the lobby of an office building containing several tenants, and, hence, the terminal is available to different subscribers, each of which has one or more check controlled meters and associated checks 14.

With reference to FIG. 3, the apparatus includes sensing means 30 disposed in association with the check receiving means 12 and an encoding means 32, also associated with the receiving means 12. The sensing means 30, the encoding means 32 and the manual input means (keyboard) 16 are coupled by respective data transmission means 34a, b and c to a computing means 36 which includes among other functions a processor and a memory as is well known to those skilled in the art. The computing means 36 can receive and store also via an input 38 programming instructions including such information as blocking an account of a subscriber for "credit hold", increasing the amount of credit, restricting the credit per unit of time, etc.

DESCRIPTION OF THE OPERATION

A subscriber desirous to render the check in his possession useful or ready for charging a postage meter under his cognizance inserts the check 14 in the check receiving means 12. The sensing means is operated and senses, for instance, the account number from field 18 and the meter number from field 20 and communicates such data to the computing means 36 via conductor 34a. Additionally, the subscriber is required to input via the keyboard 16 certain additional information. In a typical example, the additional information may comprise additional subscriber information and the readings displayed by the ascending and descending register counters of the postage meter. The ascending and descending numbers are summed in the computing means 36 and checked in the memory of the computing means. This sum remains constant between rechargings, see U.S.

Pat. No. 3,792,446 issued to R. B. McFiggins et al dated Feb. 12, 1974.

Assuming that the information supplied via input means 16 and the information sensed and supplied from the sensing means 30 is correct and correlates with data stored in the computing means 36 and assuming that no adverse information is present with respect to the particular account or subscriber, encoding information is transmitted from the computing means via conductor 34b to the encoding means 32 for suitably encoding the field 22 of the check with a meter charge code for rendering the check capable, when associated with the particular postage meter, of incrementing the credit by a predetermined amount of monetary value. The predetermined amount may be predetermined by the setting of the meter mechanism or the coding in the field 22, see patents supra. Subsequent to such encoding of field 22, a transport mechanism (not shown) returns the check from the receiving means 12. If the information supplied to the computing means fails to correlate or there is adverse credit information with respect to the particular account, the check may be returned uncoded in field 22, invalidated for further use, or alternatively the check may be retained within the apparatus 10 with proper advice to the subscriber.

The conductors 34a, b and c may comprise a telephone link or other data transmission means and, in fact, may comprise a single connection as it is possible, as is well known to those skilled in the art, to transmit a plurality of data over a single connection.

In an alternative embodiment the numbers apparent on the ascending and descending counters are encoded on the check and the subscriber is required to merely input the additional subscriber information.

As stated heretofore, the apparatus 10 may be installed in the lobby of an office building and a plurality of consoles 10 disposed in different buildings or even cities may be connected to a central computing means 36.

The present invention makes it possible to validate in a simplified manner a check usable for operating a metering device by computer controlled encoding means.

While there has been described and illustrated a preferred embodiment of my invention, it will be apparent to those skilled in the art that various changes and modifications may be made therein without deviating from the principle of this invention which shall be limited only by the scope of the appended claims.

What is claimed is:

1. In a check controlled metering device, such as a check controlled postage meter, the combination comprising:
   an apparatus having check acceptance means for receiving a check having coded data thereon;
   sensing means cooperatively associated with said check acceptance means for sensing the coded data on a check received by said acceptance means;
   input means associated with said apparatus for inputting data related to rendering the metering device operable;
   computing means including means for receiving and storing credit data adapted to be coupled to said sensing means and said input means for receiving said sensed coded data and said data from said input means and processing the received data and providing a meter charge code responsive to the received data and credit data stored in said computing means being in predetermined relation, and
   encoding means associated with said check acceptance means for encoding a check received in said acceptance means with said meter charge code.

2. In a check controlled metering device as set forth in claim 1, said input means comprising manually operated means.

3. In a check controlled metering device as set forth in claim 2, said input means being adapted to input to said computing means numerical values responsive to meter settings associated with the metering device.

4. In a check controlled metering device as set forth in claim 3, said numerical values being normally in predetermined relation.

5. In a check controlled metering device as set forth in claim 1, said sensing means adapted to sense magnetically coded data.

6. In a check controlled metering device as set forth in claim 1, said computing means being disposed remote from said apparatus having said sensing means, said input means, and said encoding means, and a data link coupling said apparatus to said computing means.

* * * * *